Patented Mar. 3, 1942

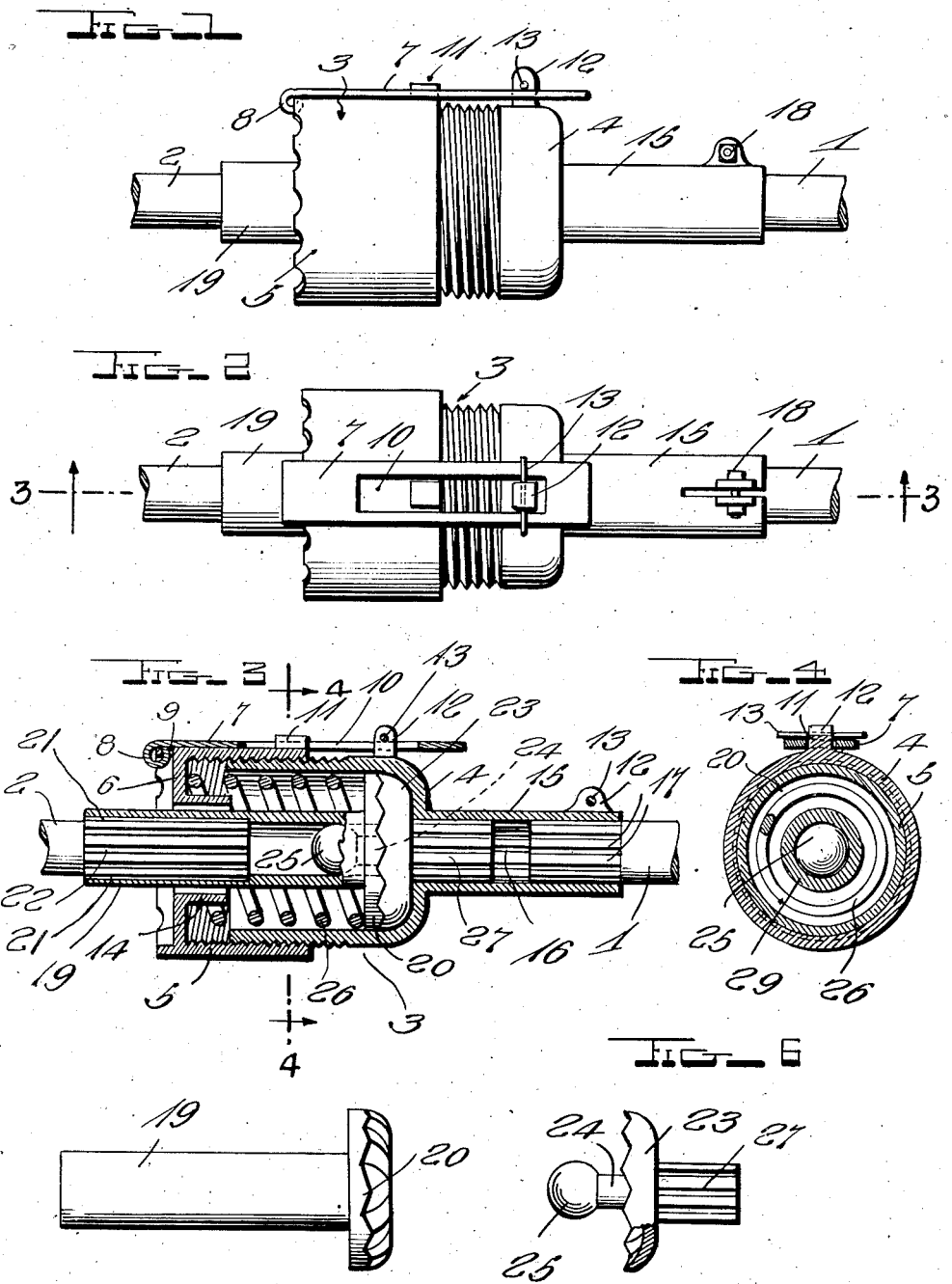

2,275,004

UNITED STATES PATENT OFFICE 2,275,004

SHAFT COUPLING

Fred H. Behl, Milan, Minn.

Original application October 22, 1940, Serial No. 362,294. Divided and this application April 7, 1941, Serial No. 387,303

3 Claims. (Cl. 64—29)

This invention relates to an improved shaft coupling and the present application constitutes a division of my pending application Ser. No. 362,294, filed October 22, 1940.

One object of the invention is to provide an improved coupling for connecting a drive shaft with a driven shaft and allow slippage under excessive strain. It will thus be seen that elements which are operatively associated with the drive shaft or the driven shaft will not be broken by excessive strain.

Another object of the invention is to provide a coupling wherein clutch members are enclosed in a housing or casing adapted for engagement with shafts, one clutch member being urged toward the other so that normally rotary motion will be transmitted through the coupling from a drive shaft to a driven shaft.

Another object of the invention is to provide the clutch casing with companion sections having threaded engagement with each other so that by turning one casing section it may be adjusted longitudinally of the other and a spring in the casing placed under desired tension and clutching engagement of the clutch members controlled.

Another object of the invention is to provide the adjustable casing section with a member which may be used as a lever for turning this casing section and also as a latch for holding it in adjusted position.

Another object of the invention is to provide a coupling which is simple in construction, strong and durable, and not liable to break or get out of order.

In the drawing:

Fig. 1 is a side elevation of the improved clutch.

Fig. 2 is a top plan view thereof.

Fig. 3 is a sectional view taken longitudinally through the clutch on the line 3—3 of Fig. 2.

Fig. 4 is a sectional view taken transversely through the clutch on the line 4—4 of Fig. 3.

Fig. 5 is a view of one of the clutch members.

Fig. 6 is a view of the companion clutch member with a portion in section.

This improved coupling is employed for connecting a drive shaft 1 with a driven shaft 2, it being understood that the shaft 1 may be rotated from any suitable source of power and that the shaft 2 may serve as a drive shaft for machinery of any nature, or the two shafts may constitute sections of a line shaft.

This coupling has a casing, indicated in general by the numeral 3, and constituting companion sections 4 and 5 which may be referred to as a cup-shaped body or casing proper 4 and a cap 5 for the casing. The wall of the cap has an extension which projects outwardly from the peripheral edge of its head 6 and carries a latch or keeper 7 which is pivotally mounted by a rolled end 8 loosely engaged through an opening 9. The keeper-strip 7 is formed with a longitudinally extending slot 10 to accommodate the lugs 11 and 12 which project laterally from the annular wall of the cap 5 and from the annular wall of the casing 4 respectively, and it will be readily understood that when the keeper is in the operative position shown in the drawing, the cap will be prevented from turning about the casing. When the pin or equivalent fastener 15 is removed, the latch or keeper may be swung outwardly to inoperative position, in which it projects radially from the cap and may be used as a lever for turning the cap about the casing, and since the cap has threaded engagement with the casing, turning of the cap will shift it along the casing in accordance with the direction in which the cap is turned. After the cap has been shifted to the desired position, the keeper will be returned to its initial position in which the lugs pass through the slot 10 and the pin then replaced to retain the keeper in the operative position.

A short tubular neck 14 extends inwardly from the head 6 about an opening formed centrally therein and this neck is alined with a tubular shank 15 projecting outwardly from the head of the casing axially thereof about an opening formed centrally thereof. The neck 14 is, however, of greater diameter than the shank. Internally, the shank is formed with longitudinally extending ribs 16 and the drive shaft 1 is formed with ribs 17 so that when the end of the drive shaft is thrust into the shank and the bolt 18 tightened to contract the shank about the shaft, the shank and casing will turn with the drive shaft. In view of the fact that the cap is held in fixed relation to the casing by the keeper, the cap will turn with the casing.

The hollow shank 19 of a clutch member 20 is passed through the neck 14 and is of such diameter that it may have limited tilting movement in the neck. Internal ribs 21 are formed in the shank 19 longitudinally thereof for engagement with the ribs 22 of the driven shaft 2 to cause the shaft to turn with the clutch member. The companion clutch member 23 is formed wtih a neck 24 which passes through an opening at the center of the clutch member 20 and terminates in a spherical head 25 which is received in the forward portion of the tubular shank 19. This is clearly shown in Fig. 3, and referring to this figure, it will be seen that the clutch member 20 is yieldably held in gripping engagement with the clutch member 23 by a spring 26 housed in the casing with its rear portion disposed about the neck 14 of the cap. By adjusting the cap on the casing, tension of the spring may be controlled and the ease with which slippage may take place between the clutch members controlled. The shank 27 of the clutch member 23 is formed with longitudinally extending ribs which engage the ribs formed in the neck or shank 15 of the casing and this causes the clutch member 23 to turn with the casing. Under normal conditions, the teeth of the two clutch members remain in engagement with each other so that rotary motion will be transmitted to the driven shaft but, if excessive strain develops for any reason, the teeth of the coupler member 23 will slide over the teeth of the coupler member 20 and the drive shaft may continue rotating without rotary motion being transmitted to the driven shaft. In view of the fact that the shank 24 of the clutch member 23 is formed with a spherical head 25 which is snugly received in the tubular shank of the clutch member 20, the shank 19 may have limited tilting movement in the neck 14 of the cap and the coupling serve as a universal coupling for the two shafts.

Having thus described the invention, what is claimed is:

1. A coupling for connecting a driven shaft with a drive shaft, said coupling comprising a casing having a tubular shank extending therefrom and adapted for connection with the drive shaft, a cap threaded on said casing and having a head formed with a center opening and a tubular neck extending inwardly about the opening, a stationary clutch member in the casing having a shank extending into the shank of the casing and held against turning movement therein, a movable clutch member in said casing formed with a center opening and having a tubular shank surrounding its center opening and extending outwardly through the neck of the cap and adapted for connection with the driven shaft, the stationary clutch member having a neck extending therefrom through the center opening of the movable clutch member into the tubular shank thereof and terminating in a spherical head engaging walls of the tubular shank and permitting universal tilting of the movable clutch member, and a spring in the casing coiled about the neck and the shank of the movable clutch member with one end bearing against the head of the cap and its other end bearing against the movable clutch member and urging the movable clutch member toward the stationary clutch member.

2. A coupling for connecting a drive shaft with a driven shaft comprising a casing having one end adapted for connection with one shaft and its other end open, a cap threaded to said casing in closing relation to the open end thereof, a clutch in said casing, lugs extending laterally from the cap and the casing, and a latch pivoted to the cap for swinging movement toward and away from the lugs and formed with a longitudinally extending slot to receive the lugs and hold the cap stationary.

3. A coupling for connecting a driven shaft with a drive shaft, said coupling comprising a casing having a shank extending therefrom and adapted for connection with the drive shaft, a stationary clutch member in the casing, a cap for said casing in threaded engagement therewith, said cap having a center opening surrounded by an inwardly extending tubular neck, a movable clutch member in the casing having a shank extending therefrom through the neck and the opening of the cap and adapted for connection with the driven shaft, the movable clutch member being connected with the stationary clutch member for universal tilting movement, a spring in the casing coiled about the shank of the movable clutch member with one end bearing against the cap and its other end bearing against the movable clutch member and urging the same toward the stationary clutch member, the cap when turned in a tightening direction applying predetermined tension to the spring, and means for releasably holding the cap in set position.

FRED H. BEHL.